(12) United States Patent
Nakaoka et al.

(10) Patent No.: US 11,199,740 B2
(45) Date of Patent: Dec. 14, 2021

(54) DISPLAY DEVICE, DISPLAY METHOD, AND COLOR SEPARATION DEVICE

(71) Applicant: Japan Display Inc., Tokyo (JP)

(72) Inventors: Chikyu Nakaoka, Tokyo (JP); Masaaki Kabe, Tokyo (JP); Tatsuya Yata, Tokyo (JP); Kojiro Ikeda, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/700,346

(22) Filed: Dec. 2, 2019

(65) Prior Publication Data

US 2020/0103700 A1 Apr. 2, 2020

Related U.S. Application Data

(63) Continuation of application No. 15/912,007, filed on Mar. 5, 2018, now Pat. No. 10,514,570.

(30) Foreign Application Priority Data

Mar. 3, 2017 (JP) .............................. JP2017-041143

(51) Int. Cl.
*G02F 1/1335* (2006.01)
*G02F 1/1362* (2006.01)
(Continued)

(52) U.S. Cl.
CPC ...... *G02F 1/133514* (2013.01); *G02F 1/1326* (2013.01); *G02F 1/133528* (2013.01);
(Continued)

(58) Field of Classification Search
CPC ......... G02F 1/136286; G02F 1/133621; G02F 1/133514; G02F 1/1326; G02F 1/133528;
(Continued)

(56) References Cited

U.S. PATENT DOCUMENTS

| 5,506,701 A | 4/1996 | Ichikawa |
| 5,959,704 A * | 9/1999 | Suzuki ................. H04N 9/3108 349/9 |

(Continued)

FOREIGN PATENT DOCUMENTS

| JP | H09-050024 A | 2/1997 |
| JP | 9-318942 A | 12/1997 |

(Continued)

OTHER PUBLICATIONS

Japanese Office Action dated Feb. 16, 2021 for Japanese Application No. 2017-041143, with machine translation provided by Global Dossier.

*Primary Examiner* — Hoan C Nguyen
(74) *Attorney, Agent, or Firm* — Michael Best & Friedrich LLP

(57) ABSTRACT

According to one embodiment, a display device includes a first arrangement layer and a second arrangement layer. The first layer includes a first pixel, a second pixel, and a third pixel are arranged periodically in one direction. The second layer is opposed to the first layer, and the second layer includes a first element, a second element, and a third element which are arranged periodically to correspond to the first pixel, the second pixel, and the third pixel, respectively, and separate emission light to light of wavelength corresponding to a first color, light of wavelength corresponding to a second color, and light of wavelength corresponding to a third color to be emitted on the first pixel, the second pixel, and the third pixel, respectively.

14 Claims, 14 Drawing Sheets

(51) Int. Cl.
  *G02F 1/13* (2006.01)
  *G02F 1/13357* (2006.01)
  *G02B 5/30* (2006.01)
  *G02B 5/18* (2006.01)
  *G02B 5/02* (2006.01)
  *G02B 5/04* (2006.01)
  *F21V 8/00* (2006.01)
  *G02B 5/20* (2006.01)
  *G02B 6/293* (2006.01)
  *G02B 6/34* (2006.01)

(52) U.S. Cl.
  CPC .. *G02F 1/133621* (2013.01); *G02F 1/136286* (2013.01); *G02B 5/02* (2013.01); *G02B 5/045* (2013.01); *G02B 5/18* (2013.01); *G02B 5/1814* (2013.01); *G02B 5/1876* (2013.01); *G02B 5/203* (2013.01); *G02B 5/30* (2013.01); *G02B 5/3025* (2013.01); *G02B 6/0025* (2013.01); *G02B 6/0026* (2013.01); *G02B 6/29311* (2013.01); *G02B 6/29316* (2013.01); *G02B 6/29329* (2013.01); *G02B 6/34* (2013.01); *G02F 1/133504* (2013.01); *G02F 1/133607* (2021.01); *G02F 1/133623* (2021.01); *G02F 2201/121* (2013.01); *G02F 2201/123* (2013.01); *G02F 2201/30* (2013.01); *G02F 2201/305* (2013.01); *G02F 2201/52* (2013.01)

(58) Field of Classification Search
  CPC .......... G02F 2201/121; G02F 2201/52; G02F 2001/133623; G02F 1/133504; G02F 2001/133607; G02F 2201/305; G02F 2201/30; G02F 2201/123; G02F 1/133623; G02B 5/1814; G02B 5/1876; G02B 5/02; G02B 5/18; G02B 6/29316; G02B 6/29311; G02B 5/3025; G02B 5/30; G02B 6/0026; G02B 6/34; G02B 6/0025; G02B 5/045; G02B 5/203; G02B 6/29329

See application file for complete search history.

(56) References Cited

U.S. PATENT DOCUMENTS

| | | |
|---|---|---|
| 8,759,929 B2 | 6/2014 | Shiozawa et al. |
| 2001/0049061 A1 | 12/2001 | Nakagaki et al. |
| 2005/0041174 A1* | 2/2005 | Numata ............... G02F 1/133621 349/61 |
| 2005/0062928 A1 | 3/2005 | Yau et al. |
| 2007/0139582 A1 | 6/2007 | Numata et al. |
| 2007/0171493 A1 | 7/2007 | Nakanishi |
| 2011/0181635 A1 | 7/2011 | Kabe et al. |
| 2016/0070035 A1 | 3/2016 | Kusama et al. |
| 2017/0199317 A1 | 7/2017 | Lee et al. |
| 2017/0337885 A1 | 11/2017 | Aoki et al. |
| 2018/0056701 A1* | 3/2018 | Nagano ............... B42D 25/324 |
| 2018/0081190 A1* | 3/2018 | Lee ...................... G02B 6/0056 |
| 2018/0113250 A1* | 4/2018 | Lee ...................... G02B 6/0056 |
| 2018/0128949 A1* | 5/2018 | Endo .................... G02B 5/0221 |

FOREIGN PATENT DOCUMENTS

| | | | | |
|---|---|---|---|---|
| JP | H10-055129 A | | 2/1998 | |
| JP | 2000305488 A | * | 11/2000 | ............ H01L 24/32 |
| JP | 2002-189216 A | | 7/2002 | |
| JP | 2005062692 A | | 3/2005 | |
| JP | 2010281850 A | * | 12/2010 | |
| JP | 2011-170257 A | | 9/2011 | |

* cited by examiner

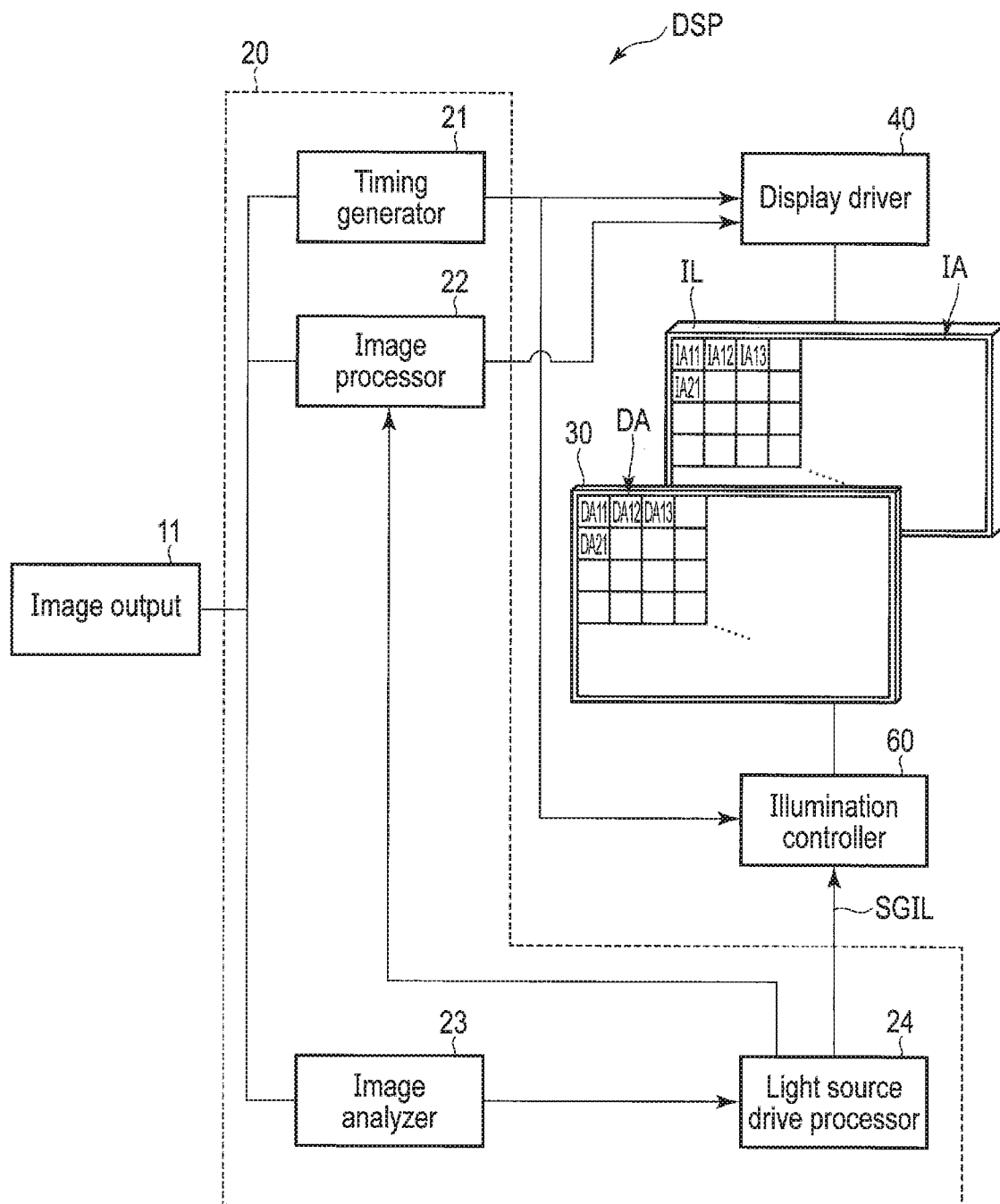
F I G. 3

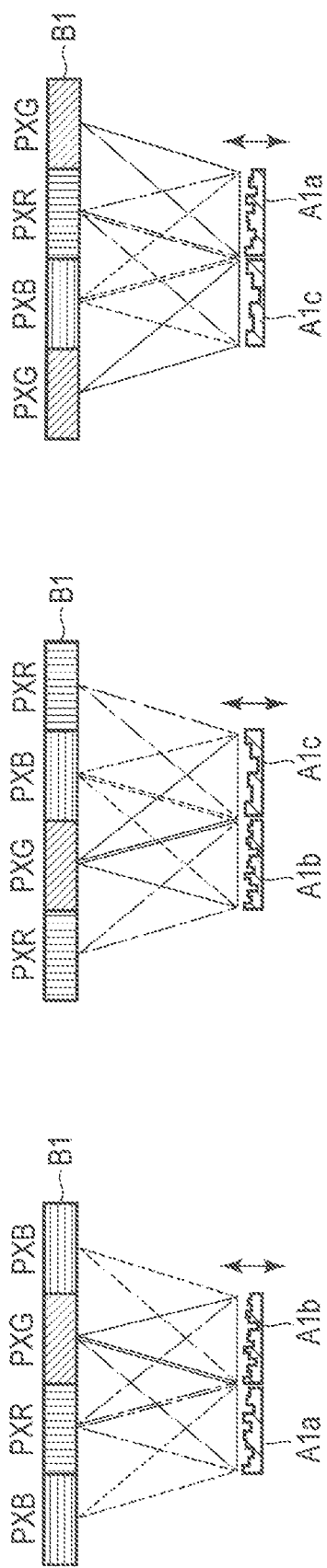
FIG. 7A
FIG. 7B
FIG. 7C
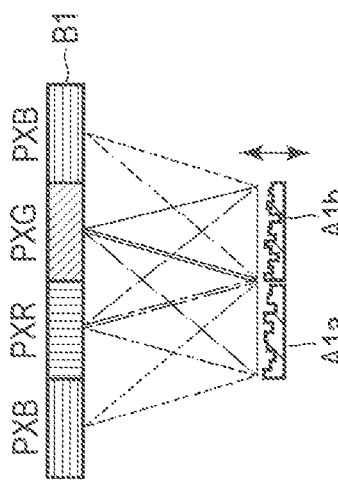
FIG. 7D

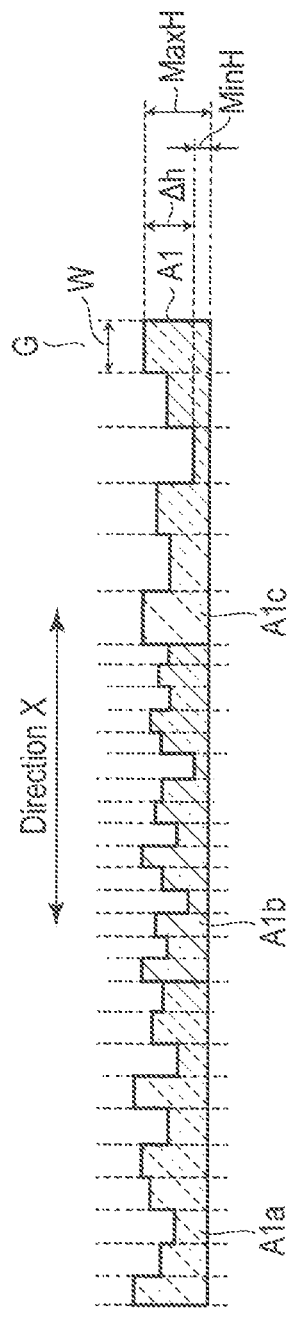
FIG. 10A
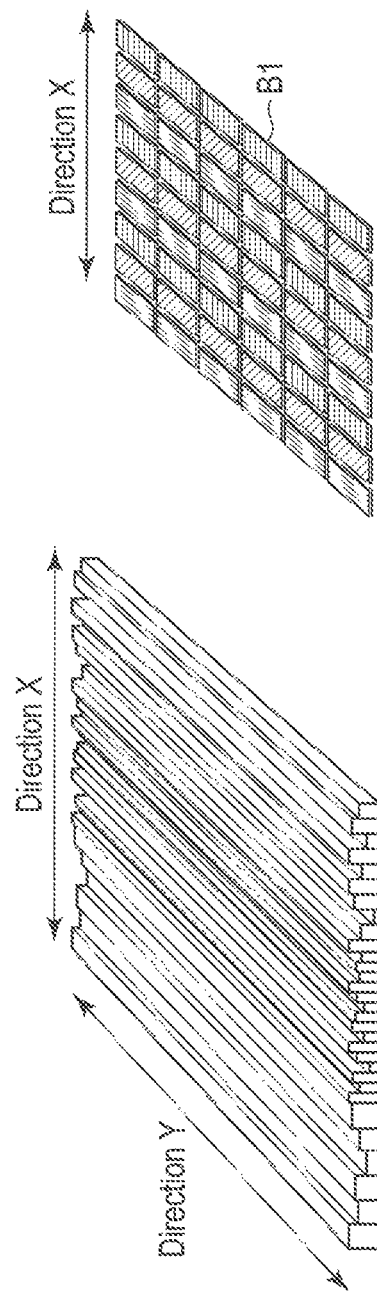
FIG. 10B
FIG. 10C

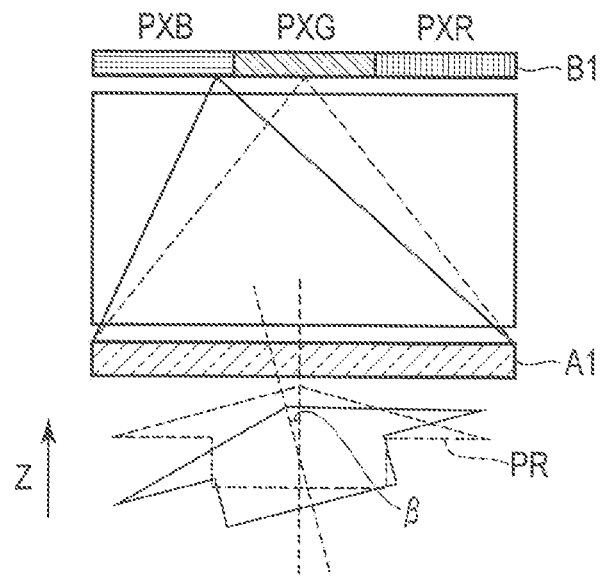
FIG. 13
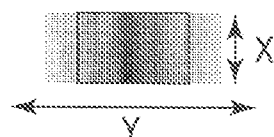
FIG. 14A
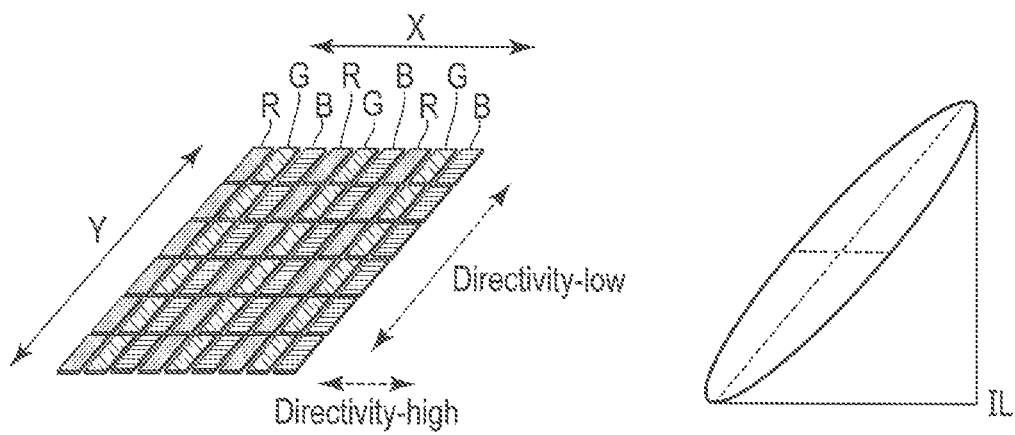
FIG. 14B
FIG. 14C

DISPLAY DEVICE, DISPLAY METHOD, AND COLOR SEPARATION DEVICE

CROSS-REFERENCE TO RELATED APPLICATIONS

The present application is a Continuation Application of U.S. patent application Ser. No. 15/912,007 filed Mar. 5, 2018, which is based upon and claims the benefit of priority from Japanese Patent Application No. 2017-041143, filed Mar. 3, 2017, the entire contents of which are incorporated herein by reference.

FIELD

Embodiments described herein relate generally to a display device, display method, and color separation device.

BACKGROUND

In conventional display devices, a color filter (CF) including filter elements corresponding to red, green, and blue (RGB) is used. In a display device with such a color filter, white light emitted from a backlight (backlight light) enters an RGB color filter arranged for each pixel and light of red, green, and blue is absorbed in each color filter to display a color image. In this display device, a color filter of each pixel absorbs light of wavelength different from red, green, and blue, and thus, the backlight light is not used sufficiently. Thus, conventionally, a color separation device including, for example, a prism (diffraction grating) and a lens is used to efficiently use the backlight light. With the color separation device, the backlight light is separated into wavelengths of red, green, and blue, and then, light of wavelength passes its corresponding color filter.

However, light separated by the color separation device has an angle dependency per color. Thus, light passing the color filter is diffused into different angle directions, and the color and the brightness tend to change depending on the viewing angle.

In order to solve such a problem of angle dependency with respect to color and brightness, conventionally, (1) disposing optical parts of lens (Fresnel lens) and a prism (diffraction grating) above and below each pixel in order to concentrate light biased to a specific direction to the front, and (2) disposing a diffusion plate of strong Haze are proposed. However, the method of (1) requires optical parts to concentrate the light biased in a specific direction to the front, and thus, costs increase. Furthermore, the method of (2) only eases a shift of exit angle, which does not give an effective solution, and may cause a significant decrease in the brightness of the front side.

BRIEF DESCRIPTION OF THE DRAWINGS

FIG. 3 is a block diagram showing an example of the structure of the display device to which a local dimming control is applied.

FIGS. 7A to 7D are cross-sectional views showing a change of phase state by a combination of three patterns of the color separation element per pixel of FIGS. 6A to 6D.

FIGS. 10A to 10C are cross-sectional view and perspective views showing a phase modulation of parallel light caused by the shapes of color separation device of FIGS. 6A to 6D and pixel color different directions.

FIG. 13 shows a critical angle in a case where the display element of the embodiment is not perfectly perpendicular.

FIGS. 14A to 14C show characteristics of an anisotropic directivity backlight type light source used in a case where a pixel of FIGS. 6A to 6D has an RGB stripe structure.

DETAILED DESCRIPTION

Figure 1:
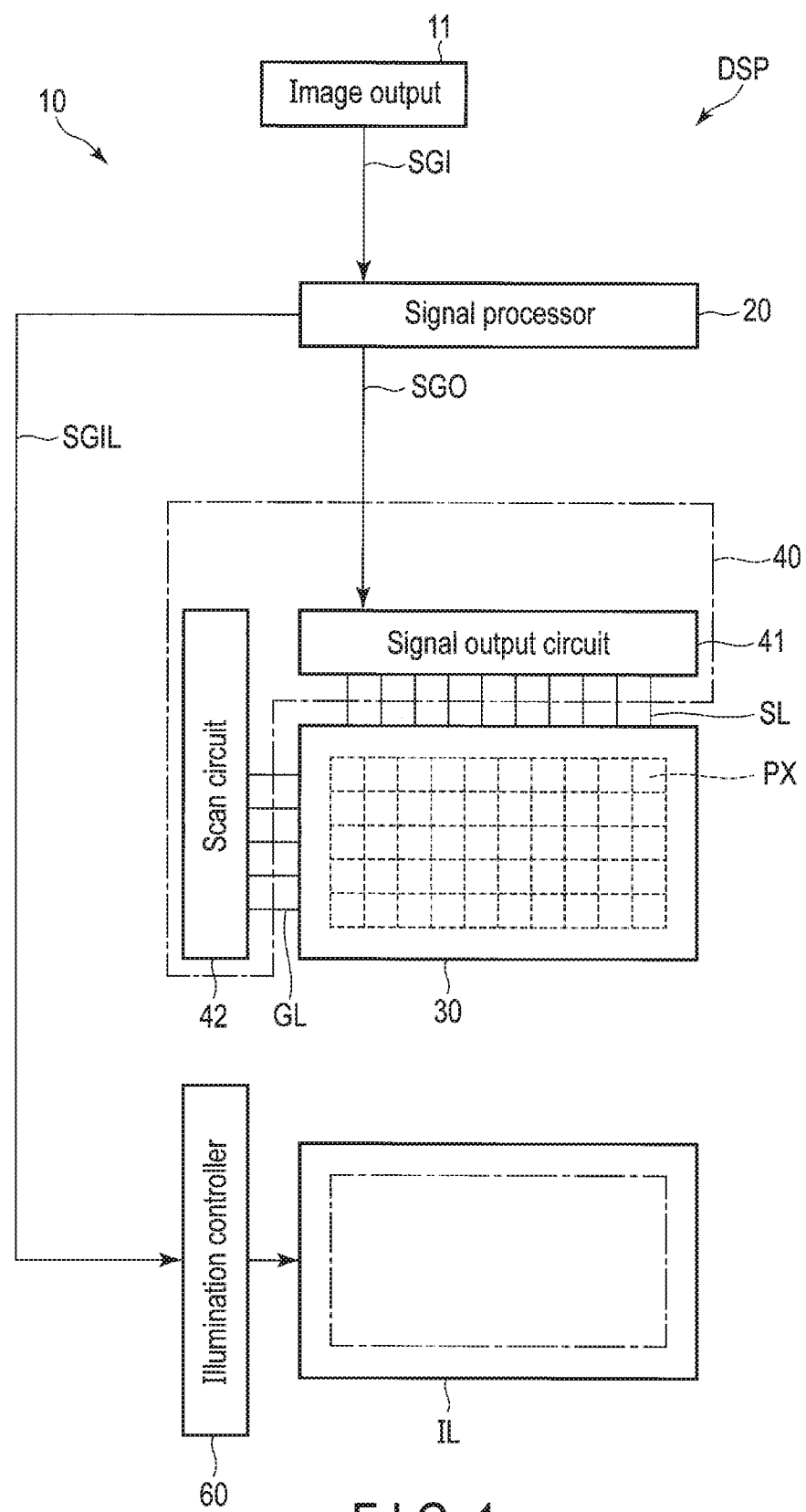
FIG. 1 is a block diagram showing the structure of a display device of an embodiment.

In general, according to one embodiment, a display device includes a first arrangement layer and a second arrangement layer. The first arrangement layer includes a first pixel with which a first color is associated, a second pixel with which a second color is associated, and a third pixel with which a third color is associated are arranged periodically in one direction. The second arrangement layer is opposed to the first arrangement layer, and the second arrangement layer includes a first element, a second element, and a third element which are arranged periodically to correspond to the first pixel, the second pixel, and the third pixel, respectively, and separate emission light to light of wavelength corresponding to the first color, light of wavelength corresponding to the second color, and light of wavelength corresponding to the third color to be emitted on the first pixel, the second pixel, and the third pixel, respectively. Thus, an image is displayed on the arrangement surface of the first pixel, second pixel, and third pixel.

Furthermore, a display method of an embodiment arranges, in a first arrangement layer, a first pixel with which a first color is associated, a second pixel with which a second color is associated, and a third pixel with which a third color is associated periodically in one direction; and arranges, in a second arrangement layer opposed to the first arrangement layer, a first element, a second element, and a third element periodically to correspond to the first pixel, the second pixel, and the third pixel, respectively, and separates emission light to light of wavelength corresponding to the first color, light of wavelength corresponding to the second color, and light of wavelength corresponding to the third color to be emitted on the first pixel, the second pixel, and the third pixel, respectively.

Furthermore, a color separation device of an embodiment includes a first element configured to diffract light of first wavelength to be gathered to a first direction, a second element configured to diffract light of the first wavelength to be gathered to a second direction which is different from the first direction, and a third element configured to diffract light of the first wavelength to be gathered to a third direction which is different from the first direction and the second direction.

With the above structures, light of wavelength corresponding to each of the first color, second color, third color is separated, without being biased to a certain direction, to have a brightness range with the same distribution, and therefore, optical parts used to concentrate light biased to a certain direction are not required.

Various embodiments will be described hereinafter with reference to the accompanying drawings.

Note that the description is an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. Furthermore, in the specification and drawings, the same elements as those described in connection with preceding drawings are denoted by like reference numerals, and a detailed description considered redundant may be omitted.

Now, a display device of an embodiment will be described.

FIG. 1 is a block diagram showing the structure of a display device DSP of the embodiment. As shown in FIG. 1, the display device DSP includes a controller 10, display 30, and illumination device IL which emits light to the display 30. The controller 10 includes a signal processor 20, display driver 40 which controls the drive of display 30, and illumination controller 60 which controls the drive of illumination device IL.

The signal processor 20 receives image signals SGI from an image output 11, sends display control signals SGO generated on the basis of the image signals SGI to each part of the display device DSP, and controls the operation of display device DSP. The signal processor 20 is connected to the display driver 40 and the illumination controller 60. Here, the signal processor 20 corresponds to a processor configured to control the operation of display 30 and illumination device IL. The signal processor 20 processes the image signals SGI input thereto and generates display control signals SGO and illumination control signals SGIL. The signal processor 20 outputs the display control signals SGO generated thereby to the display driver 40 and outputs the illumination controls signals SGIL generated thereby to the illumination controller 60.

The display 30 displays an image on the basis of the display control signals SGO output from the signal processor 20. The display 30 includes a plurality of pixels PX. The pixels PX are arranged in a matrix. Each pixel PX includes a switching element and the like.

The display driver 40 includes a signal output circuit 41 and a scan circuit 42. The signal output circuit 41 is electrically connected to the display 30 via a signal line SL. The scan circuit 42 is electrically connected to the display 30 via a scan line GL. The display driver 40 holds the display control signal SGO including an image signal by the signal output circuit 41 and sequentially outputs the display control signal SGO to the display 30. Furthermore, the display driver 40 selects pixels PX in the display 30 by the scan circuit 42 and controls the on/off state of switching elements to control the operation (light transmissivity) of pixels PX.

Figure 2:
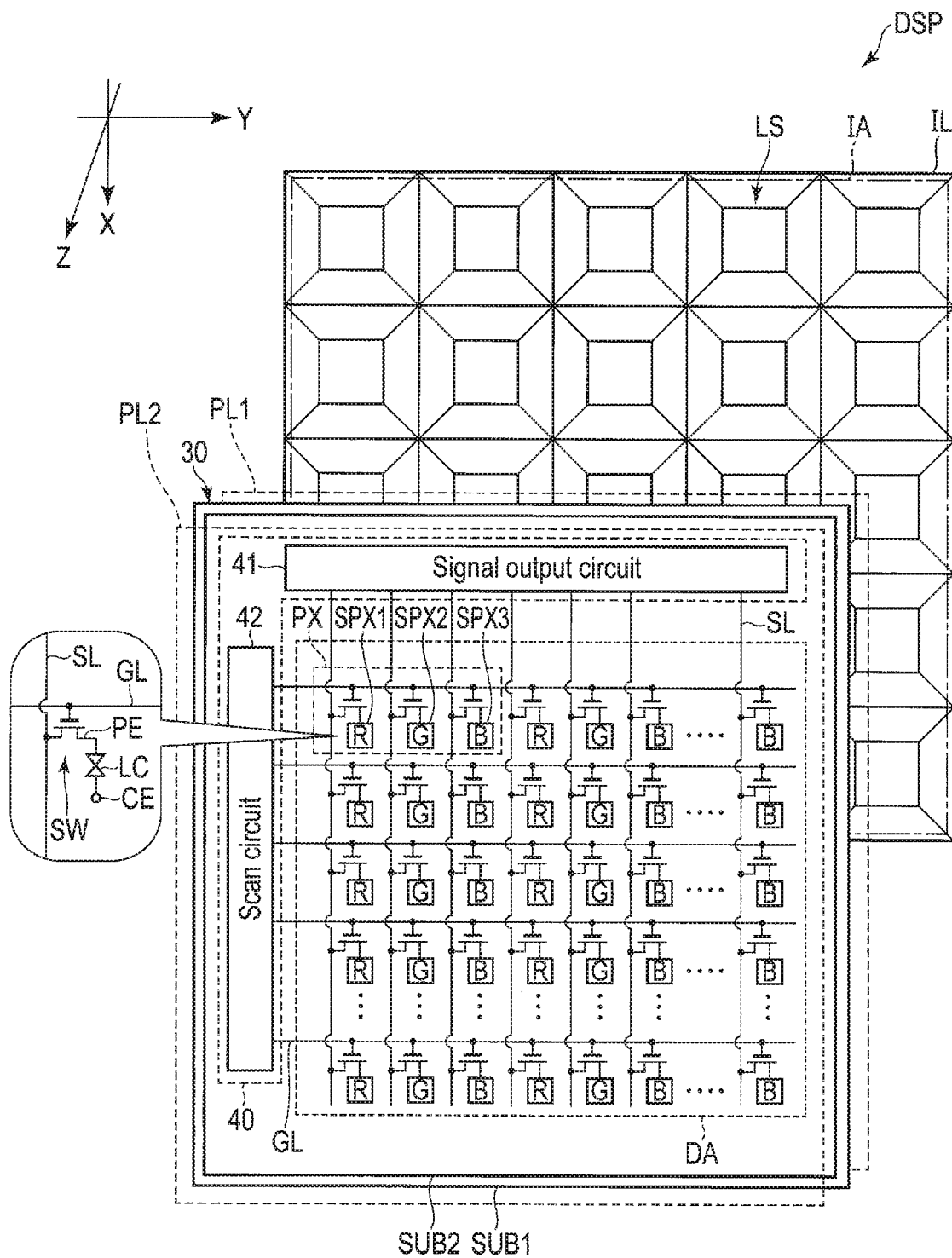
FIG. 2 shows an example of the structure of an illumination device and a display applicable to the embodiment.

FIG. 2 shows an example of the structure of the illumination device IL and the display 30 applicable to the present embodiment. In the figure, a first direction (direction X), second direction (direction Y), and third direction (direction Z) are orthogonal to each other: however, they may cross at an angle other than 90°. The X-Y plane defined by the directions X and Y is parallel with the main surfaces of the display 30 and other optical parts such as illumination device IL. The direction Z corresponds to a layering direction of the illumination device IL and the display 30, or a travelling direction of light emitted from the illumination device IL.

In the example depicted, the display 30 is a liquid crystal display panel, and includes a first substrate SUB1, second substrate SUB2, and liquid crystal layer LC. The liquid crystal layer LC is held between the first substrate SUB1 and the second substrate SUB2 as a display function layer. The first substrate SUB1 is, for example, a glass substrate or a film substrate. Furthermore, the second substrate SUB2 is, for example, a glass substrate or a film substrate. In the rear surface side of the first substrate SUB1, a polarizer PL1 is disposed. Furthermore, in the front surface side of the second substrate SUB2, a polarizer PL2 is disposed. For example, absorption axes of the polarizers PL1 and PL2 are orthogonal to each other in the X-Y plane. Note that, in this example, a side where the illumination device IL is disposed as being viewed from the display 30 is defined as the rear surface side, and the side opposite to the rear surface side of the display 30 is defined as the front surface side.

The display 30 includes a display area DA which displays an image. The display 30 includes, in the display area DA, a plurality of pixels PX arranged in a matrix in the directions X and Y. The pixels PX include, for example, a first pixel PXR, second pixel PXG, and third pixel PXB. The first pixel PXR is associated with a first color. For example, a red color filter as a first color is disposed, and the first pixel PXR displays red. The second pixel PXG is associated with a second color. For example, a green color filter as a second color is disposed, and the second pixel PXG displays green. The third pixel PXB is associated with a third color. For example, a blue color filter as a third color is disposed, and the third pixel PXB displays blue. Here, the display control signals SGO output by the signal processor 20 include a display control signal SGOR corresponding to the first color, display control signal SGOG corresponding to the second color, and display control signal SGOB corresponding to the third color. Thus, the first pixel PXR is driven on the basis of the display control signal SGOR of first color to display red, the second pixel PXG is driven on the basis of the display control signal SGOG of second color to display green, and the third pixel SPXB is driven on the basis of the display control signal SGOB of third color to display blue.

In the first substrate SUB1, a plurality of scan lines GL (gate lines) and a plurality of signal lines SL (data lines or source lines) crossing the scan lines GL are provided. Each scan line GL is drawn to the outside of the display area DA to be connected to the scan circuit 42. Each signal line SL is drawn to the outside of the display area DA to be connected to the signal output circuit 41. The scan circuit 42 and the signal output circuit 41 are controlled on the basis of the display control signals SGO including image data used to display an image on the display area DA.

Each pixel PX includes, for example, a switching element SW (for example, thin film transistor), pixel electrode PE, and common electrode CE. The switching element SW is electrically connected to the scan line GL and the signal line SL. The pixel electrode PE is electrically connected to the switching element SW. The common electrode CE is opposed to a plurality of pixel electrodes PE. The pixel electrode PE and the common electrode CE function as drive electrodes to drive the liquid crystal layer LC as a display function layer. The pixel electrode PE and the common electrode CE are formed of a transparent conductive material such as indium tin oxide (ITO) or indium zinc oxide (IZO).

The illumination device IL is disposed in the rear surface of the display 30 to emit light toward the display 30. The illumination device IL includes an illumination area IA opposed to the display area DA. The illumination device IL includes a light source LS in the illumination area IA. The light source LS is disposed in a matrix. The light source LS is, for example and not limited to, light emitting diodes which emit while light. Such a light source LS which emits white light may be, for example, one-chipped light emitting diodes of red, green, and blue, or a combination of blue or near ultra violet light emitting diodes and a fluorescent substance. The light source LS can control the brightness on the basis of a current supplied thereto.

For example, one light source LS is disposed to be opposed to a sub display area including m×n pixels PX. Note that m and n are a positive integer, wherein m corresponds to the number of pixels PX aligned in the direction X and n corresponds to the number of pixels PX aligned in the direction Y. Turning on/off of each light source LS can be controlled individually. Thus, the illumination device IL can form a sub illumination area turning on/off of which can be controlled individually in the illumination area IA. The sub illumination area includes at least one light source LS. The sub illumination area can be formed in various shapes such as a band-like shape extending in the direction X, band-like shape extending in the direction Y, matrix in the directions X and Y.

Now, local dimming control will be described.

FIG. 3 is a block diagram showing an example of the structure of the display device DSP to which a local dimming control is applied. The illumination device IL includes, in the illumination area IA, a plurality of sub illumination areas IA11, IA12, . . . , and a sub illumination area IA1 is formed in a matrix. The display 30 includes, in the display area DA, a plurality of sub display areas DA11, DA12, . . . , and a sub display area DA1 is formed in a matrix. As explained with reference to FIG. 2, each sub illumination area includes one or more light source. Each sub display area is opposed to the sub illumination area and includes m×n pixels PX. The brightness of the sub illumination area can be controlled on the basis of a current value supplied to the light source. Thus, the brightness of each sub illumination area can be changed by changing the current value of each light source of the sub illumination areas. Light emitted from each sub illumination area illuminates the sub display area opposed thereto. Thus, in the display area DA, the brightness of sub illumination area illuminating the sub display area including many of pixels PX of low gradation is set to low, and the brightness of sub illumination area illuminating the sub display area including many of pixels PX of high gradation is set high, and a contrast ratio of an image displayed in the display area DA can be improved.

Here, an example of the control will be explained. As shown in FIG. 1, image signals SGI which are data of an image to be displayed are input to the signal processor 20 from an external image output 11. The signal processor 20 includes a timing generator 21, image processor 22, image analyzer 23, and light source drive processor 24.

The timing generator 21 synchronizes the drive of display 30 for image display and the drive of illumination device IL. That is, the timing generator 21 processes the image signals SGI input thereto to send synchronization signals to synchronize timing between the display 30 and the illumination controller 60 per frame period to the display driver 40 and the illumination controller 60.

The image processor 22 performs a process to display an image in the display 30 on the basis of the drive of illumination device IL. That is, the image processor 22 generates display control signals SGO used to determine display gradation of each of the first to third pixels on the basis of the image signals SGI input thereto, and outputs the display control signals SGO to the display driver 40. Furthermore, the image processor 22 adjusts the data on the basis of the image signals SGI input thereto according to adjustment signals from the light source drive processor 24 such that an image corresponding to the drive of light source can be displayed, and generates display control signals SGO. The image analyzer 23 analyzes an image displayed in sub illumination areas IA11, IA12, . . . on the basis of the input signals SGI, and outputs the analysis data to the light source drive processor 24. The light source drive processor 24 determines a drive value of each light source on the basis of the analysis data from the image analyzer 23 and outputs the brightness data per pixel to the image processor 22 as adjustment signals. The light source drive processor 24 generates illumination control signals SGIL on the basis of the brightness data and outputs the illumination control signals SGIL to the illumination controller 60. The illumination controller 60 controls the illumination device IL on the basis of the illumination control signals SGIL output from the light source drive processor 24.

Figure 4:
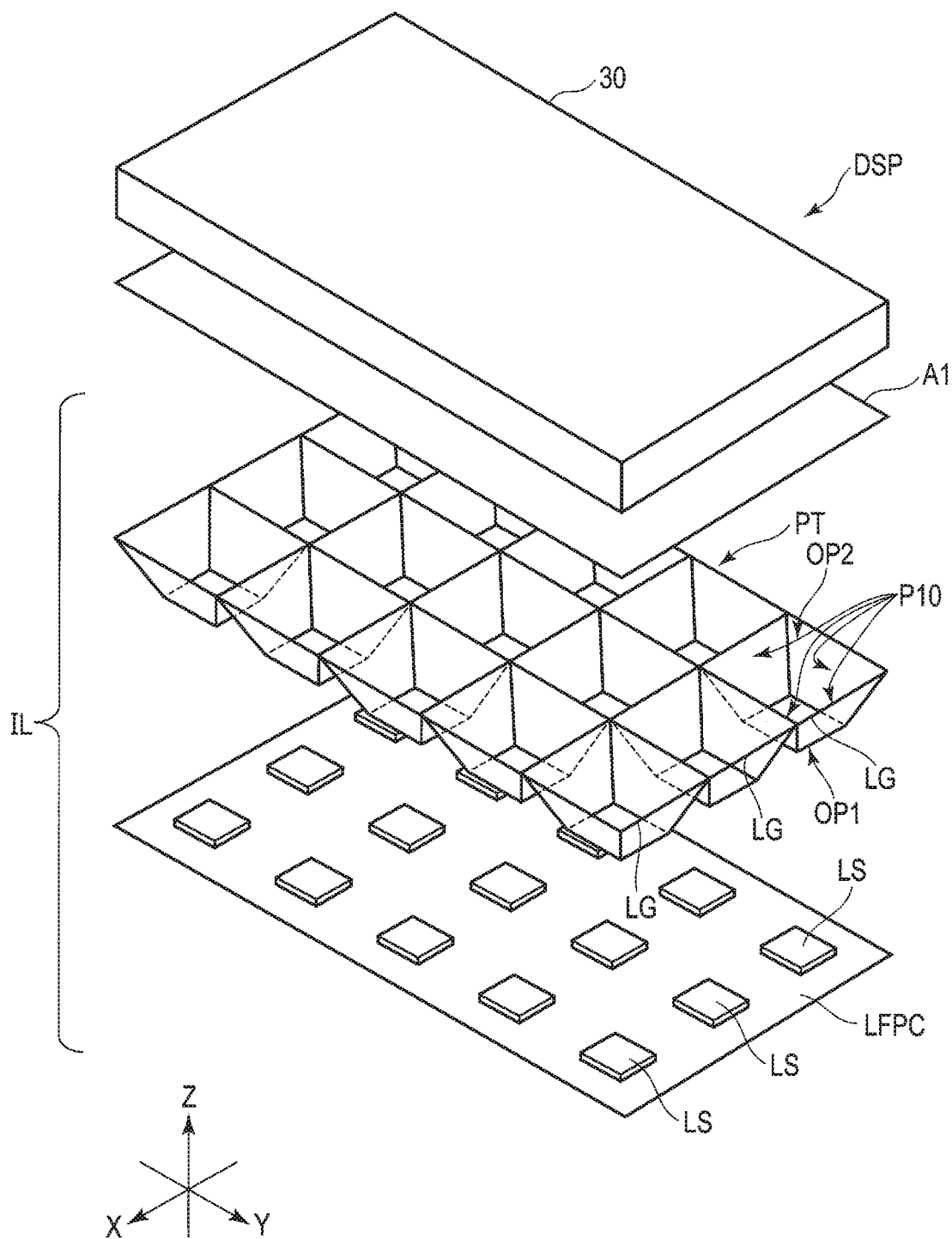
FIG. 4 is a perspective view of the display device of the present embodiment in a disassembled manner.

FIG. 4 is a perspective view of the display device DSP of the present embodiment in a disassembled manner.

The illumination device IL is disposed in the rear surface side of the display 30. The illumination device IL includes a plurality of light sources LS and a partition PT disposed between the light sources LS and the display 30. Between the illumination device IL and the display 30, a color separation device A1 is disposed. The color separation device A1 separates light of certain wavelength into certain directions. The light sources LS are arranged in a matrix in the directions X and Y. The light sources LS are each mounted in a circuit substrate LFPC.

The partition PT includes a light guide LG which guides the light from each light source LS to the color separation device A1. The light guide LG is opposed to each of the light sources LS and is formed in a matrix in the directions X and Y. One light guide LG is opposed to one light source LS. Here, one light source LS includes at least one light emitting element such as light emitting diode (LED).

Now, the structure of one light guide LG will be described.

The light guide LG includes a first opening opposed to the light source LS, second opening OP2 opposed to the color separation device A1, and side surface P10 surrounding the light source LS. In the example depicted, the light guide LG includes four side surfaces P10 surrounding one light source LS. Furthermore, the first opening OP1 and the second opening OP2 are each formed as a quadrangle, wherein the area of first opening OP1 is less than the area of second opening OP2. Note that, in this example, the area of first opening OP1 is equal to or greater than the area of light source LS, and furthermore, the shape of first opening OP1 is arbitrarily determined on the basis of the outer shape of the light source LS, and the light source LS is fit in the first opening OP1. Such a light guide LG formed as a frustum spreading from the light source LS to the color separation device A1.

Note that, the number of side surfaces P10 surrounding one light source LS is four in this example; however, no limitation is intended thereby. Furthermore, the shape of first opening OP1 and second opening OP2 is a quadrangle in this example; however, it may be a circle, ellipse, or any other polygonal shape.

Figure 5A:
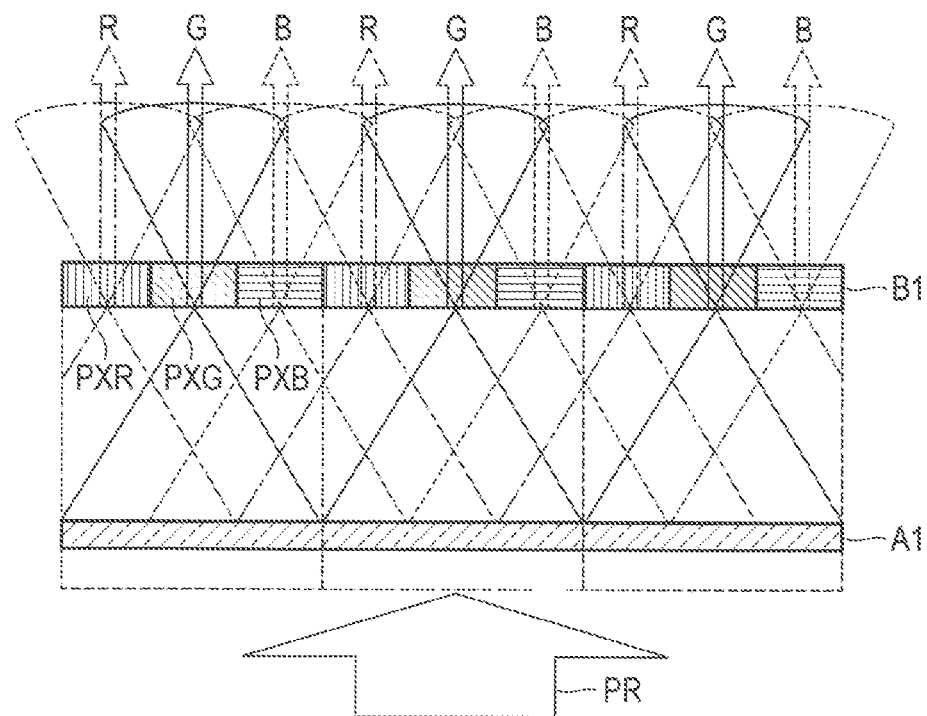
FIGS. 5A and 5B are cross-sectional views showing a concept of color separation in an RGB color filter display element used in the display device of the present embodiment and a comparative example.
Figure 5B:
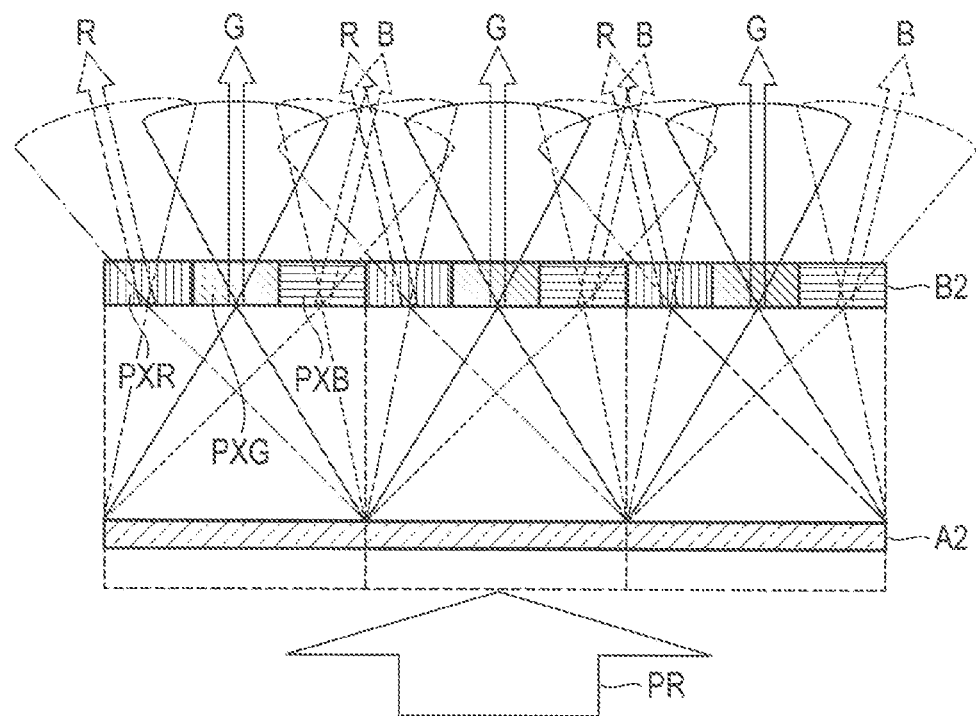

FIGS. 5A and 5B are cross-sectional views showing a concept of color separation in an RGB color filter display element used in the display device of the present embodiment and a comparative example. FIG. 5A shows the structure of the display device of the embodiment, and FIG. 5B shows the structure of a conventional display device. The display devices include either color separation device A1 or A2 and pixel line B1 or B2 in which first pixel PXR, second pixel PXG, and third pixel PXB included in the display 30. If parallel light PR light axis of which is in a certain direction is emitted from the illumination device IL to these display devices, the conventional color separation device A2 diffracts the light from the same area to three adjacent pixels associated with different colors as shown in FIG. 5B while the color separation device A1 of the present embodiment diffracts the light from an area shifted by one pixel to three adjacent pixels associated with different colors as shown in FIG. 5A. Note that the pixel lines B1 and B2 of red, green, and blue are substantially the same.

That is, in the present embodiment, a parallel light source which emits parallel light PR is used as the illumination device IL such that the light enters vertically to the color separation device A1 which separates the light in different wavelengths. The color separation device A1 separates and gathers three colors of red, green, and blue. In the proximity of the light gathering surface, pixel line B1 of each pixel of the display panel is disposed such that an area gathering three colors is shifted by one pixel per color. When a viewing angle is widened, a diffusion layer or a lens is disposed after the light gathering of the pixel line B1.

Figure 6D:
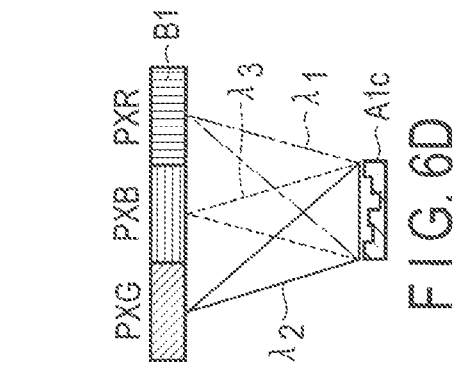
FIGS. 6A to 6D are cross-sectional views showing three structural patterns of the color separation element per period and per pixel of the display element of FIGS. 5A and 5B.
Figure 6A:
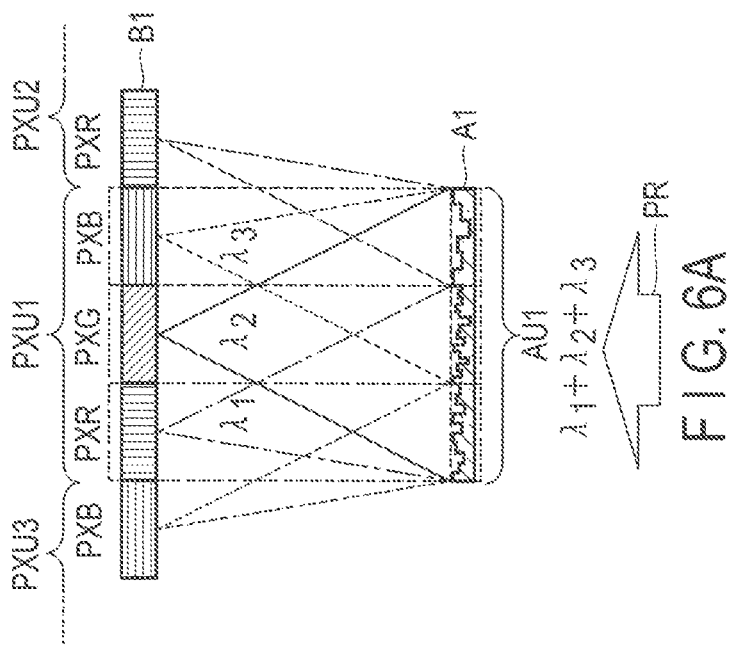

FIG. 6A shows the structure of the color separation device A1 per period with respect to the pixel line B1 used in the display device of FIG. 5A, and FIGS. 6B, 6C, and 6D are cross-sectional views showing the pattern structures of the first element A1a having a first structure, second element A1b having a second structure, an third element A1c having a third structure, respectively, in the color separation device A1. In the present embodiment, the first element A1a is disposed in a position associated with the first pixel PXR1, second element A1b is disposed in a position associated with the second pixel PXG2, and third element A1c is disposed in a position associated with the third pixel PXB3. The color separation device A1 is formed of a transparent dielectric material in an optional convex/concave pattern, and the first, second, third structures of the first element A1a, second element A1b, and third element A1c are different from each other. Furthermore, the color separation device A1 generates phase modulation in the parallel light PR upon incident thereof on the basis of the shape of color separation device A1, and diffracts the transmitting light in an optional direction using the phase modulation. The first element A1a, second element A1b, and third element A1c are periodically arranged as with the pixel line B1 in which first pixel PXR, second pixel PXG, and third pixel PXR are periodically arranged in this order.

As shown in FIG. 6A, the color separation device includes an element group A1U including the first element A1a, second element A1b, and third element A1c, and the element groups AU are arranged periodically in the direction X. In other words, the structural period of the color separation device corresponds to a width of the element groups AU in the direction X. Furthermore, a pixel arrangement layer includes a pixel group PXU including a first pixel PXR, second pixel PXG, and third pixel PXB, and the pixel groups PXU are arranged periodically in the direction X. In other words, the pixel period of the pixel arrangement layer corresponds to a width of the pixel groups PXU in the direction X. The structural period of the color separation device and the pixel period of the pixel arrangement are the same. Furthermore, in the present embodiment, first wavelength λ1, second wavelength λ2, and third wavelength λ3 correspond to the first pixel PXR, second pixel PXG, and third pixel PXB, respectively, wherein first wavelength λ1>second wavelength λ2>third wavelength λ3.

Figure 6C:
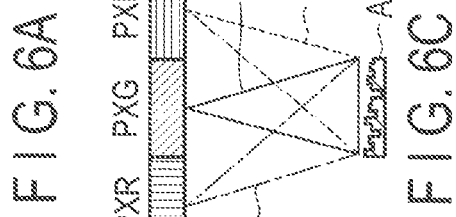
Figure 6B:
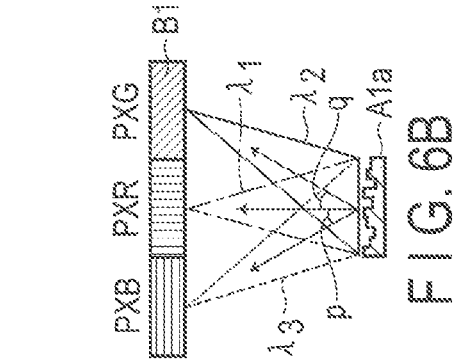

The first element A1a having the pattern structure of FIG. 6B diffracts the light of first wavelength λ1 to be gathered to the first pixel PXR1 which is opposed to the first element A1a, diffracts the light of third wavelength λ3 to be gathered to the third pixel PXB1 in the left side of the first pixel PXR1, and diffracts the light of second wavelength λ2 to be gathered to the second pixel PXG1 in the right side of the first pixel PXR1. In other words, the first element A1a diffracts the light of first wavelength λ1 to be gathered to a first diffraction direction which is perpendicular to the substrate plane of the color separation device, diffracts the light of third wavelength λ3 to be gathered to a second diffraction direction tilted by a certain angle p with respect to the perpendicular direction, and diffracts the light of second wavelength λ2 to be gathered to a third diffraction direction tilted by a certain angle q with respect to the perpendicular direction.

The second element A1b having the pattern structure of FIG. 6C diffracts the light of second wavelength λ2 to be gathered to the second pixel PXG2 which is opposed to the second element A1b, diffracts the light of first wavelength λ1 to be gathered to the first pixel PXR2 in the left side of the second pixel PXG2, and diffracts the light of third wavelength λ3 to be gathered to the third pixel PXB2 in the right side of the second pixel PXG2. In other words, the second element A1b diffracts the light of second wavelength λ2 to be gathered to the first diffraction direction, diffracts the light of first wavelength λ1 to be gathered to the second diffraction direction, and diffracts the light of third wavelength λ3 to be gathered to the third diffraction direction.

The third element A1C having the pattern structure of FIG. 6D diffracts the light of third wavelength λ3 to be gathered to the third pixel PXB3 which is opposed to the third element A1c, diffracts the light of second wavelength λ2 to be gathered to the second pixel PXG3 in the left side of the third pixel PXG3, and diffracts the light of first wavelength λ1 to be gathered to the first pixel PXR3 in the right side of the third pixel PXB3. In other words, the third element A1c diffracts the light of third wavelength λ3 to be gathered to the first diffraction direction, diffracts the light of second wavelength λ2 to be gathered to the second diffraction direction, and diffracts the light of first wavelength λ1 to be gathered to the third diffraction direction.

Note that the width of each pixel and the width of each element are the same; however, they may differ. For example, the width of each element may be set greater than the width of each pixel by a certain width α.

Furthermore, as shown in FIG. 6A, one element group AU1 is disposed to be opposed to one pixel group PXU1 including the first pixel PXR, second pixel PXG, and third pixel PXB adjacent to each other. With the element group AU1 and the pixel group opposed to each other, the light of second wavelength λ2 are all diffracted to the second pixel PXG of the corresponding pixel group PXU1 by the element group AU1.

Furthermore, ⅔ of the light of first wavelength λ1 is diffracted by the element group AU1 to the second pixel PXR of the corresponding pixel group PXU1, and ⅓ thereof is diffracted by the element group AU1 to the first pixel PXR of the pixel group PXU2 adjacent to pixel group PXU1 in the right side. Furthermore, ⅔ of the light of third wavelength λ3 is diffracted to the third pixel PXB of the corresponding pixel group PXU1 by the element group AU1, and ⅓ thereof is diffracted to the third pixel PXB of the pixel group PXU3 adjacent to the pixel group PXU1 in the left side.

Note that, in order to design the above-described arrangement, an element group AU corresponding to a pixel group PXU is not designed, but each of first element A1a, second element A1b, and third element A1c having three types of pattern structures which diffract the colors in different directions are designed separately, and the three elements are combined in order to design an element group AU (first element A1a+second element A1b+third element A1c=element group AU). The first element A1a having a first structure corresponding to left ⅓ of the pattern structure of the element group AU gathers, as shown in FIG. 6B, light of first wavelength λ1 in the center, light of second wavelength λ2 to the right side, and light of third wavelength λ3 to the left side. Furthermore, the second element A1b having a second structure corresponding to middle ⅓ of the pattern structure of the element group AU gathers, as shown in FIG. 6C, light of second wavelength λ2 to the center, light of third wavelength λ3 in the right side, and light of first wavelength λ1 to the left side. Furthermore, the third element A1c having a third structure corresponding to right ⅓ of the pattern structure of the element group AU gathers, as shown in FIG. 6D, light of third wavelength λ3 to the center, light of first wavelength λ1 in the right side, and light of second wavelength λ2 in the left side.

Note that, in general, a color separation device sets a diffraction strength to a square of amplitude regardless of a phase and increases only the amplitude in a design position for the optimization. In the present embodiment, however, different phases in a combination of different elements may cancel each other and the diffraction strength may be decrease. In consideration of this point, the following method is adopted in the present embodiment.

FIGS. 7A to 7D are cross-sectional views showing a change in a phase state by a combination of three patterns of color separation device A1 of a pixel shown in FIGS. 6A to 6D. FIG. 7A shows a phase difference between the first element A1a and the second element A1b, FIG. 7B shows a phase difference between the second element A1b and the third element A1c, FIG. 7C shows a phase difference between the third element A1c and the first element A1a, and FIG. 7D shows the first element A1a, second element A1b, and third element A1c are arranged to correspond to a pixel group PXU.

For example, in an arrangement of the first element A1a and the second element A1b in FIG. 7A, a common thickness WA of the elements is optimized such that the light of first wavelength λ1 passing through the first element A1a and the light of first wavelength λ1 passing the second element A1b increase the phase, and the light of second wavelength λ2 passing through the first element A1a and the light of second wavelength λ2 passing through the second element A1b increase the phase.

Similarly, in an arrangement of the second element A1b and the third element A1c in FIG. 7B, a common thickness WA of the elements is optimized such that the light of second wavelength λ2 passing through the second element A1b and the light of second wavelength λ2 passing the third element A1c increase the phase, and the light of third wavelength λ3 passing through the second element A1b and the light of third wavelength λ3 passing through the third element A1c increase the phase.

In an arrangement of the third element A1c and the first element A1a in FIG. 7C, a common thickness WA of the elements is optimized such that the light of first wavelength λ1 passing through the third element A1c and the light of first wavelength λ1 passing the first element A1a increase the phase, and the light of third wavelength λ3 passing through the third element A1c and the light of third wavelength λ3 passing through the third element A1c increase the phase. Here, the common thickness WA of the elements indicates, in each element, a gap between the bottom surface of the light separation device and the deepest groove.

With the above structure, when light is incident perpendicularly with respect to the color separation device A1, the diffraction strength does not changes at all and only the phase state changes even if a certain thickness is added. Thus, by suitably arranging the thickness WA of each designed element to increase all three colors.

Figure 8:
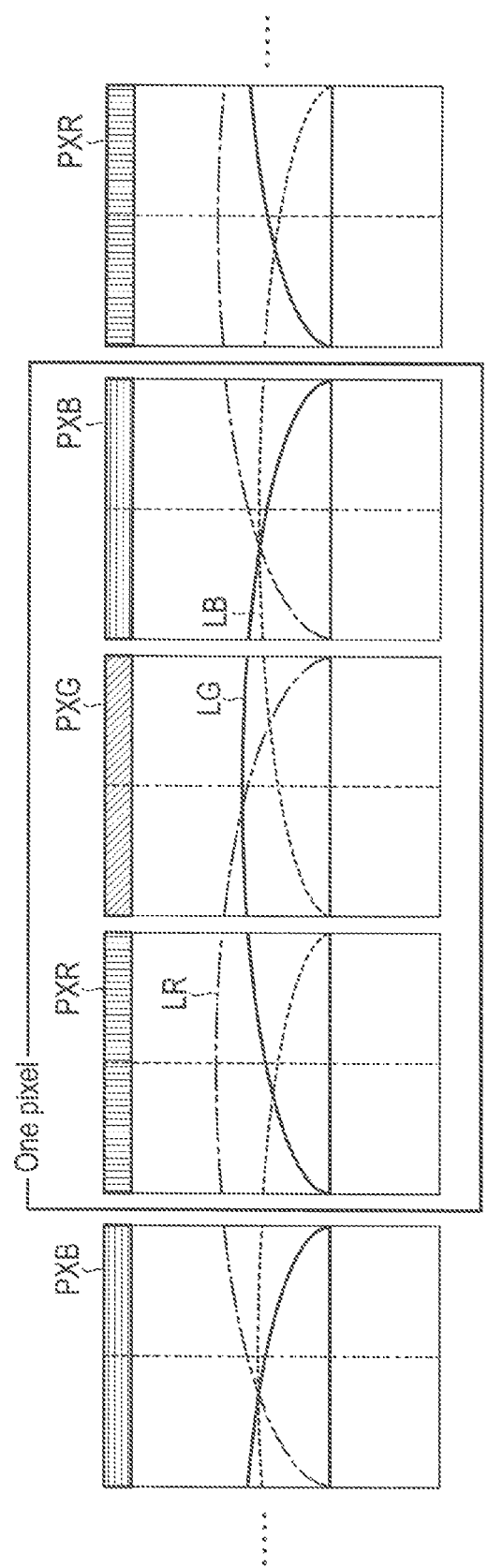
FIG. 8 is a cross-sectional view showing a model of three color-three type lenses using the three patterns of the color separation element per pixel of FIGS. 6A to 6D.

FIG. 8 is cross-sectional view showing the color separation device A1 functioning as three types of lenses corresponding to different colors. Specifically, the color separation device A1 functions as a first lens LR opposed to the first pixel PXR corresponding to the first color, second lens LG opposed to the second pixel PXG corresponding to the second color, and third lens LB opposed to the third pixel PXB corresponding to the third color. Furthermore, each of the first lens LR, second lens LG, and third lens LB has a focal axis in the center of the pixel opposed to the lens, and has a size corresponding to three pixels center of which is the opposed lens. The color separation device A1 functions as such three types of lenses repeated one after another by a single element.

Figure 9A:
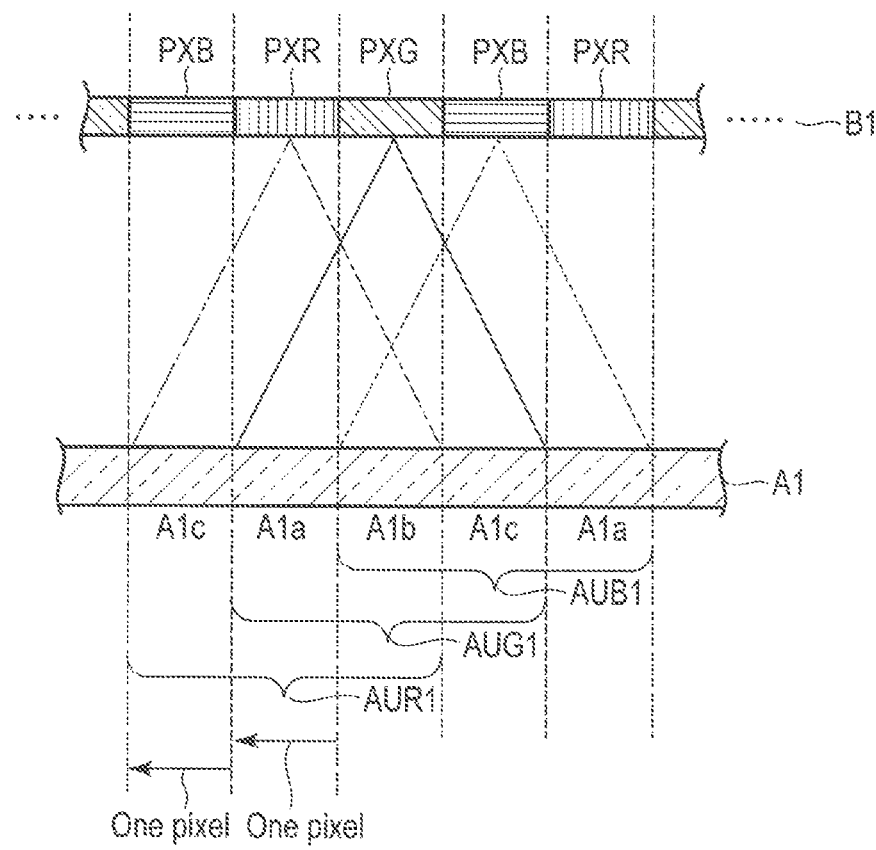
FIGS. 9A and 9B are cross-sectional views showing a three-color periodic structure of the color separation element per pixel of FIGS. 6A to 6D.
Figure 9B:
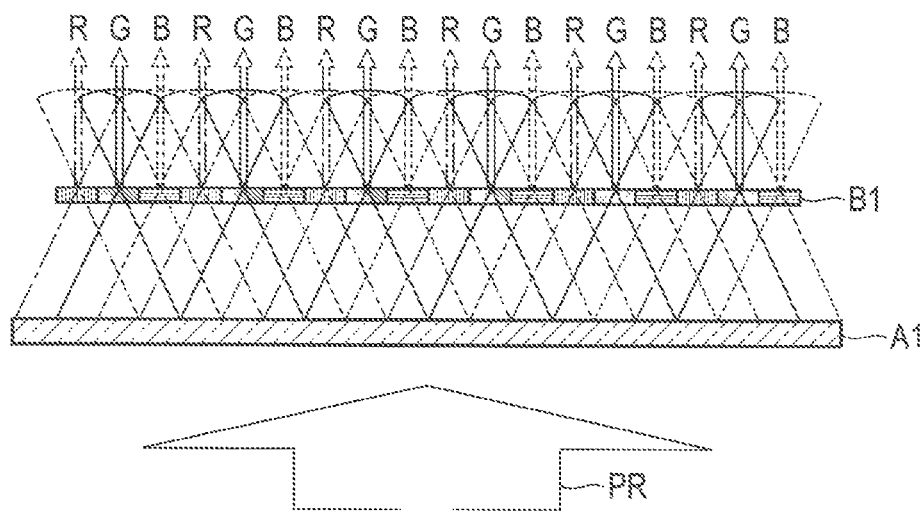

FIGS. 9A and 9B are cross-sectional views showing a corresponding relationship between the pixels PX corresponding to each color shown in FIGS. 6A to 6D and the elements of the color separation device. FIG. 9A shows a corresponding relationship between each pixel and each element, FIG. 9B shows a distribution of light of each wavelength when the parallel light PR is irradiated to the color separation device. As shown in FIGS. 9A and 9B, a first structure AUR1 which gathers light to the first pixel PXR1, second structure AUG1 which gathers light to the second pixel PXG1, and third structure AUB1 which gathers light to the third pixel PXB1 are formed to be shifted by one pixel.

In the present embodiment, the first structure AUR1 includes the third element A1c, first element A1a, and second element A1b arranged in this order, second structure AUG1 includes the first element A1a, second element A1b, and third element A1c arranged in this order, and third structure AUB1 includes the second element A1b, third element A1c, and first element A1a arranged in this order. The first structure AUR, second structure AUG, and third structure AUB are arranged periodically corresponding to the first pixel PXR, second pixel PXG, and third pixel PXB, respectively. By shifting the position of the structure gathering light of each color, the three colors are diffracted at the same angle, and an angle shift of each color after passing through the pixels can be prevented.

FIGS. 10A to 10C show, in a case where the pixels associated with different colors are periodically arranged in the direction X, the shapes of the color separation device A1 in a pixel color different direction (direction X) and in a direction orthogonal to the pixel color different direction (direction Y). FIG. 10A is a cross-sectional view showing the structure of the phase modulation part (direction X) of the parallel light PR incident to the first element A1a, second element A1b, and third element A1c. FIG. 10B is a perspective view showing the shape of the color separation device A1 in the directions X and Y, and FIG. 10C is a perspective view showing a pixel arrangement where red, green, and blue pixels are in a uniformed stripe shape. The color separation device A1 is formed of a transparent dielectric material such as glass or polycarbonate, and if the pixel line B1 includes, as shown in FIG. 10C, the first pixel PXR, second pixel PXG, and third pixel PXB arranged in a stripe shape in the direction X, the phase modulation is generated in the pixel color different direction (direction X), and the period of element group AU=the period of pixel group PXU. Note that, as mentioned above, an area to gather each color is shifted by one pixel. On the other hand, the structure is uniform in the perpendicular direction. Note that the pixel color different direction may be the direction Y.

Note that the pixel color different direction of the color separation device A1 may be structured optionally as far as light of three colors can be separated spatially. Here, in consideration of the difficulty in manufacturing process, a multi-level step-like structure parallel to the bottom surface of the color separation device is desirable. In other words, the structure including a plurality of grooves G having sides parallel with the bottom surface and different in the height. Here, the minimum value of the width W of the groove G is, preferably, set to the maximum wavelength of the light source used to 0.6 μm. Note that the width W of the groove of the color separation device A1 may be different in each element or in each groove. Furthermore, if a height from the bottom surface of the color separation device A1 to the side parallel to the bottom surface of the groove is a groove height H, a difference Δh between the maximum height MaxH and the minimum height MinH of the groove height H is, desirably, set as thin as possible (within 5 μm) in consideration of the difficulty in manufacturing process. Note that the grove height H can be formed thinner with a material of higher refractive index.

Figure 11A:
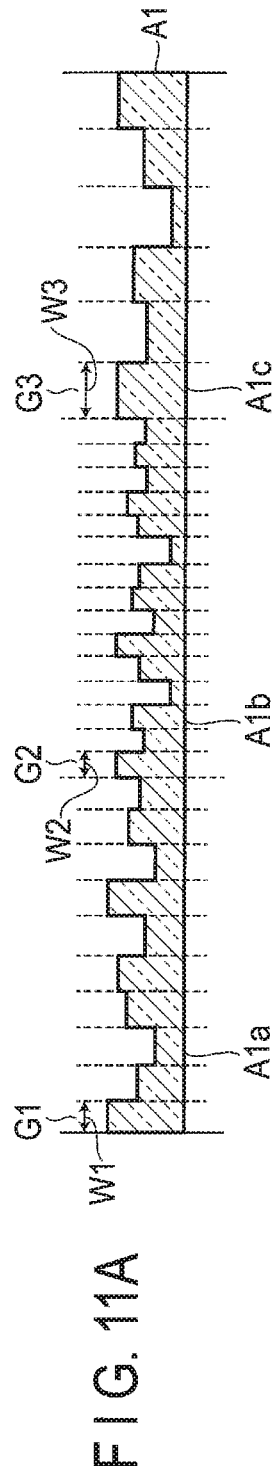
FIGS. 11A to 11C are cross-sectional views showing an average groove width, separation distance, and height of each three pattern element combined by one periodic structure of the color separation element of FIGS. 6A to 6D.
Figure 11B:
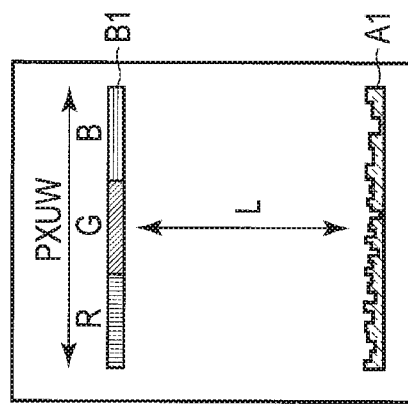
Figure 11C:
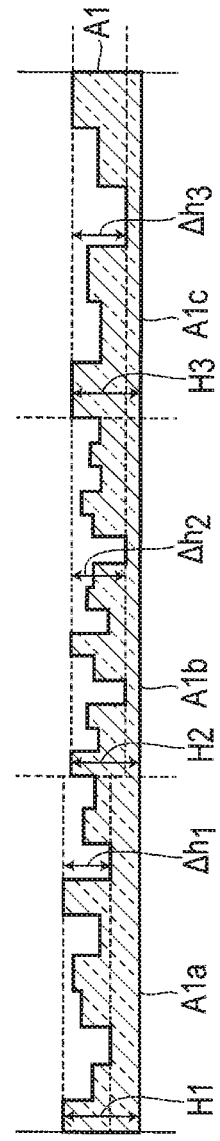

FIG. 11A shows a groove widths W1, W2, and W3 of the first element A1a, second element A1b, and third element A1c of the three patterns combined in one periodical structure of the color separation device A1 of FIGS. 6A to 6D. FIG. 11B shows a separation distance between the color separation device A1 and the pixel line B1, and FIG. 11C is a cross-sectional view showing the maximum value-minimum value of the groove heights H1, H2, and H3 of the first element A1a, second element A1b, and third element A1c of the three patterns of the color separation device A1 of FIG. 6. A width of the groove G1 included in the first element A1a is a groove width W1, a width of the groove G2 included in the second element A1b is a groove width W2, and a width of groove G3 included in the third element A1c is a groove width W3. Furthermore, given that an average width of widths W1 of grooves G1 included in the first element A1a is WA1, an average of widths W2 of grooves G2 included in the second element A1a is WA2, and an average width of widths W3 of grooves G3 included in the first element A1a is WA3, a relationship of WA2≤WA1≤WA3 is desirably satisfied. Note that the width of the groove in each element may not be constant and may differ in each element. Furthermore, given that the number of grooves G1 is N1, the number of grooves G2 is N2, and the number of grooves G3 is N3, a relationship of N2≥N1≥N3 is desirably satisfied. Here, the first element A1a gathers light of first wavelength λ1 to the center, second element A1b gathers light of second wavelength λ2 to the center, and third element A1c gathers light of third wavelength λ3 to the center, where λ1>λ2>λ3.

The groove widths W1, W2, and W3 increase/decrease depending on a pixel group width PXUW which is a width of the pixel group PXU in the pixel color different direction (direction X) and a separation gap L between the pixel group PUX and the color separation device A1. For example, if the pixel group width PXUW is constant, the average width WA of each element becomes smaller when the separation gap L becomes shorter.

Note that, in other words, the pixel group width PXUW corresponds to a pixel period in which pixels corresponding to the same color are arranged, and for example, corresponds to a gap between one end of a first pixel PXR1 to an end of first pixel PXR2 adjacent to the first pixel PXR1 in a direction (direction X). Furthermore, the separation gap L indicates a gap between any layer included in the pixel arrangement layer PXL of the pixel and the edge in the direction Z. The pixel arrangement layer PXL of the pixel includes at least a display function layer DFL (liquid crystal layer LQ), color filter layer CF, pixel electrode layer PEL.

For example, given that an air is filled between the pixel group PXU and the light separation device, if a ratio of the pixel period (pixel group width PXUW) of FIG. 11B to separation gap L is approximately 1:6, the following values are desirable.
WA1=1.7 to 2.7 μm
WA2=1.5 to 2.5 μm
WA3=2.0 to 3.0 μm Furthermore, given that an air is filled between the pixel group PXU and the light separation device, if a ratio of the pixel period (pixel group width PXUW) to separation gap L is approximately 1:4, the following values are desirable.
WA1=1.2 to 1.7 μm
WA2=1.0 to 1.5 μm
WA3=1.3 to 1.8 μm In FIG. 11C, as to the first element A1a, second element A1b, and third element A1c of three patterns combined by the element group AU of the color separation device A1, given that the height of groove G1 is H1, the height of groove G2 is H2, and the height of groove G3 is H3, and the maximum value MaxH-minimum value MinH of each groove height is Δh1, Δh2, and Δh3, a relationship of Δh1Δh2 and Δh3 is desirably satisfied. Note that a relationship between Δh2 and Δh3 is optional.

Figures 12A, 12B:
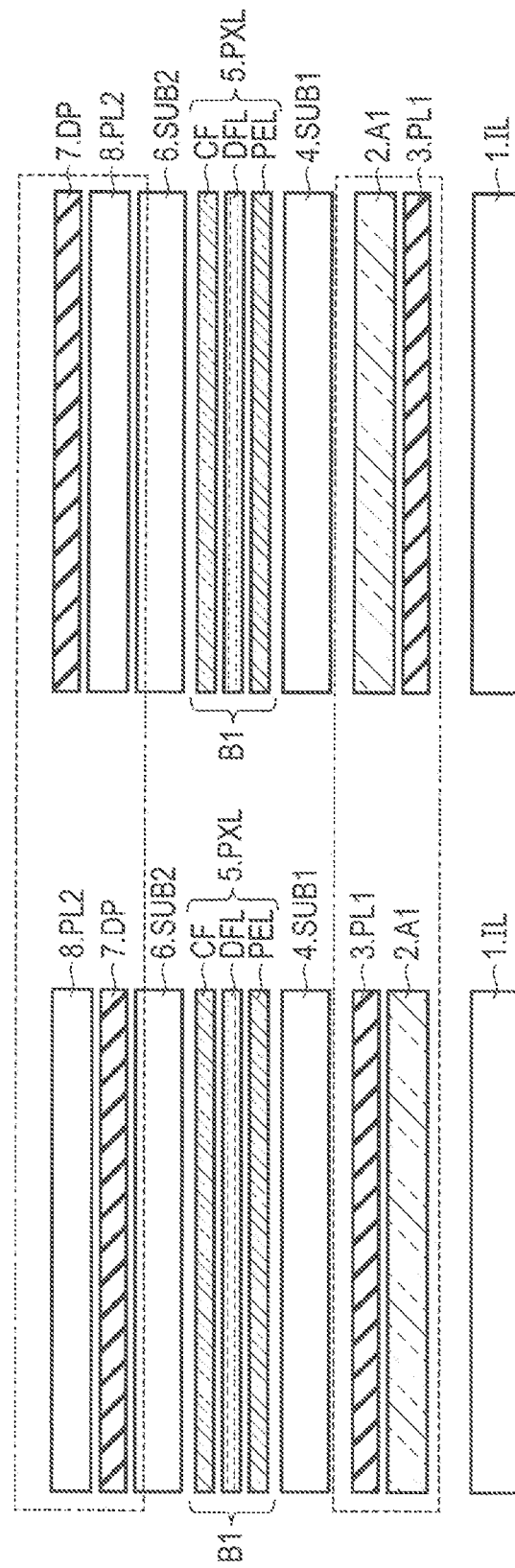
FIGS. 12A and 12B are cross-sectional views showing the structure of display element of the display device of the embodiment.

FIGS. 12A and 12B are cross-sectional views showing a specific structure of the display device of the embodiment. FIG. 12A shows a structure in which a first layer: illumination device IL, second layer: color separation device A1, third layer: first polarizer PL1, fourth layer: first substrate SUB1, fifth layer: pixel arrangement layer PXL, sixth layer: second substrate SUB2, seventh layer: diffusion plate DP, eighth layer: second polarizer PL2 are layered in this order. The pixel arrangement layer PXL includes at least the pixel electrode layer PEL, display function layer DFL (liquid crystal layer LQ), and color filter CF. In the structure shown in FIG. 12B, for example, the second layer and the third layer are replaced with the seventh layer and the eighth layer. Note that the layering order of the pixel arrangement layer PXL is not limited thereto, and for example, the pixel electrode layer PEL, color filter CF, and display function layer DFL may be layered in this order.

Note that the diffusion plate DP may be disposed in any part closer to the front surface that is the pixel arrangement layer PXL (upper part of the light transmissive surface). Furthermore, the color separation device A1 may be disposed in the pixel side as viewed from the first polarizer PL1 if the birefringence of the material is low. Furthermore, the color separation device A1 is disposed between the first polarizer PL1 disposed in the light incident surface side of the pixel arrangement layer PXL and the illumination device IL, or between the first polarizer PL1 disposed in the light incident surface side of the pixel arrangement layer PXL and the first substrate SUB1. In order to prevent a position shifting, the separation distance L between the pixel arrangement layer PXL and the color separation device A1 is desirably set closer. Thus, the color separation device A1 is desirably disposed between the first polarizer PL1 and the first substrate SUB1. Furthermore, to shorten the separation distance L, the thickness of the first substrate SUB1 is set as thin as possible (for example, 500 μm or less). In order to prevent a position shift, positional accuracy with respect to the pixels is important, and thus, the color separation device A1 is desirably adhered to the first substrate SUB1 and the first polarizer PL1.

Furthermore, the direction of convex/concave pattern of the color separation device A1 may be reversed in the direction Z. That is, the parallel light PR may not be incident onto the plan surface without the convex/concave pattern. Note that, if the parallel light enters the plan surface without the convex/concave pattern, the wavelengths to be diffracted are reversed as compared to a case where the parallel light PR enters the surface with convex/concave pattern. Furthermore, spaces between the grooves G of the color separation device A1 are desirably filled with air. Thus, the adhesive layer to the other parts is not adhered entirely but is desirably adhered with the periphery by a double-sided tape.

FIG. 13 shows the display device of the present embodiment in which an axis of light from the illumination device IL is not perfectly perpendicular to the plan surface on which the pixel arrangement layer PXL is formed, and the critical angle therein. As shown in FIG. 13, as to the color separation device A1 and the pixel line B1, a plan wave having a certain angle β with respect to the direction Z is gathered not to a target pixel but to adjacent pixels. The critical angle by which light can be gathered to a target pixel becomes greater when a focus gap (separation gap L: a gap between the color separation device A1 and the pixel line B1) becomes shorter where the same pixel period (pixel group width PXUW) is constant. The critical angle is determined on the basis of a ratio of the pixel period (pixel group width PXUW) to the separation gap L. Specifically, if the pixel period is one, the separation gap is, desirably, set to six or less, and more desirably, four or less. Furthermore, if the parallelism of light source is poor, the color separation device A1 is disposed between the first substrate SUB1 and the first polarizer PL1, and furthermore, the first substrate SUB1 is formed as thin as possible to shorten the separation gap L.

Note that the color separation device A1 is desirably formed of a material without birefringence. Furthermore, if a perfect parallel light source is used, a view angle becomes low, and thus, the view angle is widened to an optional angle using a diffusion plate or the like.

As the illumination device IL, a down-light illumination device in which a light source is disposed in a position opposed to the display area DA is exemplified; however, a device which can irradiate parallel light can be used instead. For example, a side-light illumination device in which a light source is disposed in the peripheral area outside the display area DA and parallel light PR is irradiated by a light guide plate and a prism sheet may be used. However, a down-light illumination device is preferred in consideration of an additional process to form a light guide plate and a prism sheet in a side-light illumination device.

The embodiment is effective when used in a transmissive display device. Specifically, the embodiment is suitable for a head up display (HUD) which requires the directivity of certain extent but not-so-wide view angle. As a matter of course, in a mobile terminal or TV which requires a wide view angle, the embodiment can be used by arranging a diffusion plate in the viewer side to suitably control the view angle.

FIGS. 14A to 14C show characteristics of a light source of the illumination device IL used suitably in a case where the first pixel PXR, second pixel PXG, and third pixel PXB associated with different colors have a stripe structure in the direction X. FIG. 14A shows directivity of a pixel with respect to the directions X and Y, FIG. 14B shows directivity of a display device in which pixels associated with different colors have a stripe structure with respect to the directions X and Y, and FIG. 14C shows the directivity of light from the light source.

As shown in FIGS. 14A to 14C, if pixels associated with different colors are arranged in the direction X and pixels associated with the same color are arranged in the direction Y, the parallelism of light from the illumination device IL may only involve the direction X, that is, direction to separate colors. That is, in the direction Y where the pixels associated with the same color, an illumination device of anisotropic directivity in which light from the illumination device has an optional angle spread with respect to the direction Z may be used as the illumination device IL. Or, an illumination device with no optional angle spread in the directions X and Y, that is, an omnidirective illumination device may be used. Note that, if pixels associated with the same color are disposed in either the direction X or the direction Y, the directivity of light irradiated from the illumination device may be weakened in the direction where the pixels associated with the same color are arranged.

Figure 15A:
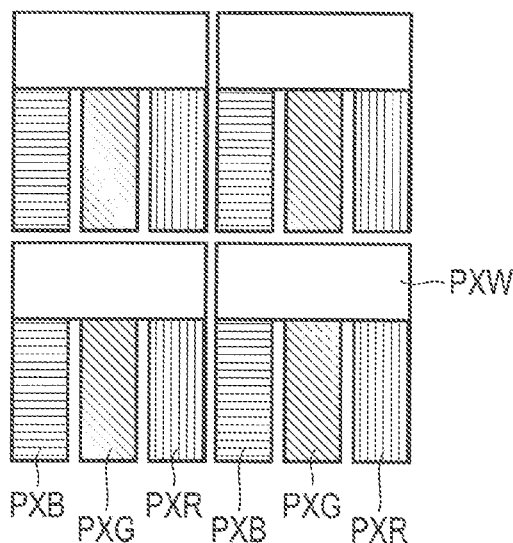
FIGS. 15A and 15B show application examples of the embodiment in a case where a pixel has an RGB stripe structure including white W.
Figure 15B:
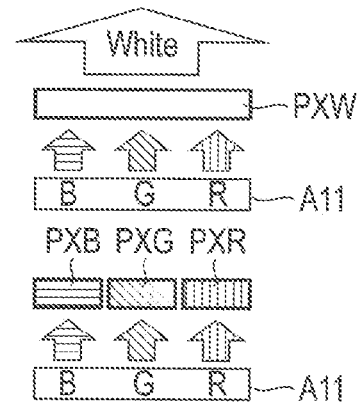

FIGS. 15A and 15B show an example of the embodiment including a fourth pixel PXW corresponding to white. FIG. 15A shows an arrangement example of the pixel group PXU including the fourth pixel PX, and FIG. 15B shows an example of light separation incident with respect to each pixel. Note that the fourth pixel PXW is a pixel with a white or transparent color filter, or a pixel without a color filter. In other words, the fourth pixel PXW is a pixel controlled on the basis of fourth color output signals SGOW generated by the signal processor 20 on the basis of the input signals SGI. Thus, the brightness of white can be improved by adding the fourth pixel PXW. For example, light of wavelength other than first wavelength $\lambda 1$, second wavelength $\lambda 2$, and third wavelength $\lambda 3$ is used to increase the brightness of white.

As a comparative example, if the first pixel PXR, second pixel PXG, and third pixel PXB, and fourth pixel PXW are arranged in a stripe in the direction X, all light separated by the color separation device A or unseparated light must be irradiated to the fourth pixel PXW. Thus, with a color separation device A2 having a color separation function shown in FIG. 5B, an element without color separation function or a slit is required in a position corresponding to the fourth pixel PXW. On the other hand, with the color separation element A1 having a color separation function of FIG. 5A, a period gathering light is different per pixel depending on the color, and thus, an element without color separation function or a slit are difficult to form between the first element A1a, second element A1b, and third element A1c.

Thus, as shown in FIG. 15A, a structure including a first line in which the fourth pixel PXW is arranged and a second line in which the first pixel PXR, second pixel PXG, and third pixel PXB are arranged in a stripe in the direction X is suitable. Note that, in the direction X, the width of fourth pixel PXW corresponds to the widths of the first pixel PXR, second pixel PXG, and third pixel PXB. That is, with the color separation device A11 of the embodiment, light of first wavelength λ1, second wavelength λ2, and third wavelength λ3 is separated in the direction X, and the fourth pixel PXW is controlled as a pixel functioning as a white pixel. Note that, such a structure including a first line in which the fourth pixel PXW is arranged and a second line in which the first pixel PXR, second pixel PXG, and third pixel PXB are arranged in a stripe in the direction X is applicable to a display device using the color separation device A2 having a color separation function as shown in FIG. 5B, or a conventional color separation device.

Figure 16A:
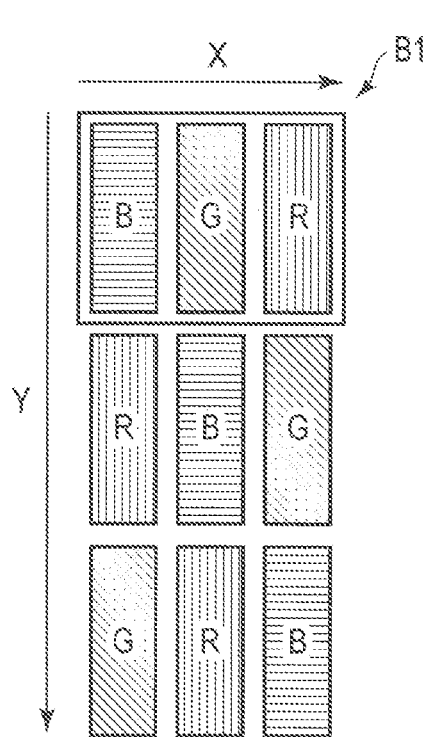
FIGS. 16A and 16B are conceptual views of a specific structure of the color separation element used in a case where pixels are arranged in a checkerboard pattern per line.
Figure 16B:
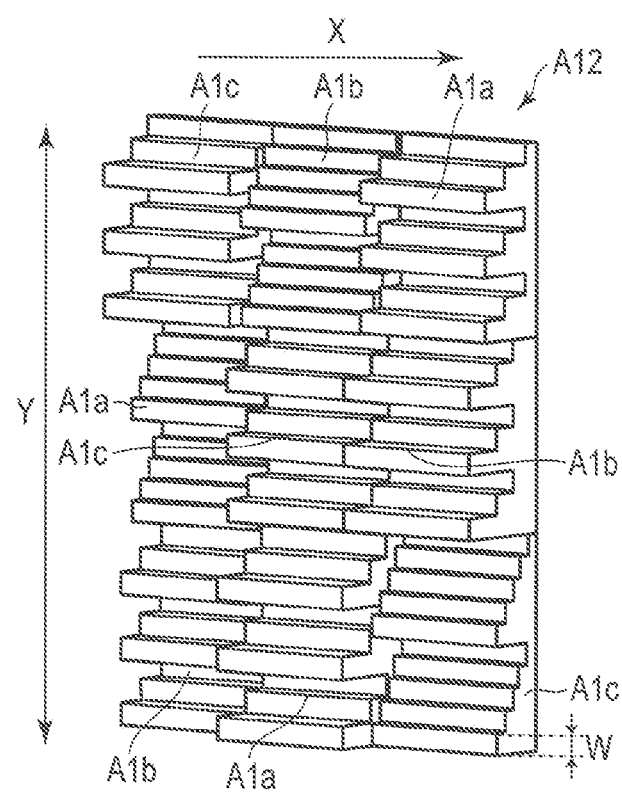

FIGS. 16A and 16B show specific structures of a color separation device A12 used when pixels associated with different colors are periodically in both the directions X and Y. FIG. 16A shows a pixel line B11 in which pixels associated with different colors are arranged in a checkerboard pattern, and FIG. 16B shows an example of the formation of the color separation device A12 with respect to the pixel line B11 of FIG. 16A.

A parallel light condition which accepts light from the illumination device IL having a certain angle β with respect to a direction perpendicular to the pixel arrangement plan depends on the pixel period (pixel group width PXUW) and the separation gap L. For example, the parallel light condition is eased when the separation gap become shorter with respect to the pixel period. However, a gap of the thickness of the first substrate SUB1 is required. That is, if the thickness of the first substrate SUB1 is fixed, the parallel light condition becomes difficult when the display definition increases. In order to ease the parallel light condition, a structure of high definition and greater pixel period is presented.

As shown in FIG. 16A, in the direction X, the first pixel PXR, second pixel PXG, and third pixel PXB are arrange periodically, and in the direction Y, the first pixel PXR, second pixel PXG, and third pixel PXB are arranged periodically. Furthermore, as shown in FIG. 16B, in the direction X, the first element A1a, second element A1b, and third pixel A1c are arranged periodically, and in the direction Y, the first element A1a, second element A1b, and third element A1c are arranged periodically. The first element A1a, second element A1b, and the third element A1c separate the parallel light PR from the illumination device IL in the direction Y. Here, a width of a pixel PX in the direction Y is three times as a width of a pixel PX in the direction X, and thus, a pixel period of direction Y is three times as a pixel period of direction X. Thus, the parallel light condition of the color separation device A12 having elements separating the light in the direction Y can be eased. Note that, in the present embodiment, the width of each pixel and the width of each element correspond to each other in the directions X and Y; however, the width of each element may be greater than the width of each pixel by a certain width α.

Note that, in FIGS. 16A and 16B, grooves exist in each pixel in the direction X where width thereof is greater as compared to a groove width of the color separation direction in the direction Y to a few μm, and visible diffraction in a gap between the color separation device A12 and the pixels does not occur. However, in an actual manufacturing process of the device, the width in the direction Y of each groove G of the elements adjacent in the direction X is, desirably, set to constant in the color separation device. For example, if the first element A1a and the third element A1c are adjacent to each other in the direction X, the groove G1 of the first element A1a and the groove G3 of the third element A1c have a constant width in the direction Y.

As can be understood from the above, the display device of the present embodiment uses the color separation device to separate light to have a brightness range with the same distribution such that light diffused in wavelengths corresponding the colors is not biased in a certain direction. Thus, an optical part which guides the light biased in a certain direction to the front surface is not necessary.

Note that, in the above embodiment, the display 30 is a liquid crystal display device; however, the embodiment can be applied to an organic electroluminescent display device including a white light emitting layer. That is, a white light emitting layer may be disposed instead of the illumination device IL of the embodiment, and a color separation device A1 may be disposed on the white light emitting layer. Furthermore, in the above embodiment, a color filter CF is used; however, the embodiment can be applied to a color filter-less type device since the color separation is performed in the embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms of modifications as would fall within the scope and spirit of the inventions.

What is claimed is:

1. A display device comprising:
   a display panel including a plurality of pixels, wherein pixels among the plurality of pixels associated with different colors are arranged in a first direction and pixels among the plurality of pixels associated with a same color are arranged in a second direction orthogonal to the first direction;
   a color separation device facing the pixels, including a main surface with a convex/concave pattern, and configured to:
      separate an incident light into a plurality of separated lights, and
      output the plurality of separated lights to the plurality of pixels; and
   an illumination device including a plurality of light sources and configured to emit the incident light to the color separation device, wherein
   respective ones of the plurality of light sources have a first optional angle spread in the first direction and a second optional angle spread in the second direction,
   the second optional angle spread is wider than the first optional angle spread, the plurality of pixels includes a first pixel, a second pixel, a third pixel, a fourth pixel, and a fifth pixel, the color separation device includes a first element, a second element, and a third element, the first pixel is arranged between the fourth pixel and the second pixel in the first direction, the third pixel is arranged between the second pixel and the fifth pixel in the first direction, the first element is arranged opposite to the first pixel in a thickness direction, and is configured to diffract light of a first color wavelength to the first pixel, light of a second color wavelength to the second pixel, and light of a third color wavelength to the fourth pixel, the second element is arranged opposite to the second pixel in the thickness direction, and is configured to diffract the light of the first color wavelength to the first pixel, the light of the second color wavelength to the second pixel, and the light of the third color wavelength to the third pixel, and the third element is arranged opposite to the third pixel in the thickness direction, and is configured to diffract the light of the first color wavelength to the fifth pixel, the light of the second color wavelength to the second pixel, and the light of the third color wavelength to the third pixel.

2. The display device according to claim 1, wherein
the illumination device has a third optional angle spread in the first direction and a fourth optional angle spread in the second direction, and
the fourth optional angle spread is wider than the third optional angle spread.

3. The display device according to claim 1, wherein
respective ones of the plurality of pixels have a short side in the first direction and a long side in the second direction.

4. The display device according to claim 1, further comprising a diffusion plate, wherein
the plurality of pixels are located between the diffusion plate and the color separation device.

5. The display device according to claim 1, wherein
the first element includes a first structure,
the second element includes a second structure,
the third element includes a third structure, and
the first structure, the second structure, and the third structure are different from each other.

6. The display device according to claim 5, wherein
the first structure comprises a plurality of first protruding portions,
the second structure comprises a plurality of second protruding portions,
the third structure comprises a plurality of third protruding portions,
an average value of respective widths of the plurality of first protruding portions is greater than or equal to an average value of respective widths of the plurality of second protruding portions, in the first direction, and
the average value of respective widths of the plurality of first protruding portions is less than or equal to an average value of respective widths of the plurality of third protruding portions, in the first direction.

7. The display device according to claim 5, wherein
a number of the plurality of first protruding portions is greater than or equal to a number of the plurality of second protruding portions, and
the number of the plurality of first protruding portions is less than or equal to a number of the plurality of third protruding portions.

8. The display device according to claim 5, wherein
a difference between a maximum height and a minimum height of the plurality of first protruding portions is less than or equal to a difference between a maximum height and a minimum height of the plurality of second protruding portions, and
the difference between the maximum height and the minimum height of the plurality of first protruding portions is less than or equal to a difference between a maximum height and a minimum height of the plurality of third protruding portions.

9. The display device according to claim 1, wherein
the first element, the second element, and the fourth element are configured to diffract the light of the first color wavelength to be gathered at the first pixel,
the first element, the second element, and the third element are configured to diffract the light of the second color wavelength to be gathered at the second pixel, and
the second element, the third element, and the fifth element are configured to diffract the light of the third color wavelength to be gathered at the third pixel.

10. The display device according to claim 1, wherein
a distance between the plurality of pixels and the color separation device is not more than six times as long as a group width of the first pixel, the second pixel, and the third pixel, in the first direction.

11. The display device according to claim 10, wherein
the distance is not more than four times as long as the group width.

12. The display device according to claim 1, wherein
a distance between the display panel and the color separation device is not more than six times as long as a group width of the first pixel, the second pixel, and the third pixel, in the first direction.

13. A display device comprising:
a liquid crystal display panel including a plurality of pixels;
a color separation device facing the pixels and configured to:
   separate an incident light into a red light, a blue light, and a green light,
   output the red light, the blue light, and the green light to the plurality of pixels; and
a backlight including a plurality of light sources and configured to emit the incident light to the color separation device, wherein
respective ones of the plurality of light sources have a first optional angle spread in a first direction and a second optional angle spread in a second direction orthogonal to the first direction,
the second optional angle spread is wider than the first optional angle spread,
the plurality of pixels includes a first pixel, a second pixel, a third pixel, a fourth pixel, and a fifth pixel,
the color separation device includes a first element, a second element, and a third element,
the first pixel is arranged between the fourth pixel and the second pixel in the first direction,
the third pixel is arranged between the second pixel and the fifth pixel in the first direction,
the first element is arranged opposite to the first pixel in a thickness direction, and is configured to diffract light of a first color wavelength to the first pixel, light of a second color wavelength to the second pixel, and light of a third color wavelength to the fourth pixel, the second element is arranged opposite to the second pixel in the thickness direction, and is configured to diffract the light of the first color wavelength to the first pixel, the light of the second color wavelength to the second pixel, and the light of the third color wavelength to the third pixel, and the third element is arranged opposite to the third pixel in the thickness direction, and is configured to diffract the light of the first color wavelength to the fifth pixel, the light of the second color wavelength to the second pixel, and the light of the third color wavelength to the third pixel.

14. The display device according to claim 13, wherein the plurality of pixels includes a plurality of first pixels and a plurality of second pixels, the plurality of first pixels are arranged side by side in the first direction, respective colors of the plurality of first pixels are different from each other, the plurality of second pixels are arranged side by side in the second direction, and respective colors of the plurality of second pixels are the same.

* * * * *